United States Patent [19]

Seymour

[11] Patent Number: 4,881,663

[45] Date of Patent: Nov. 21, 1989

[54] VARIEGATED SOFT ICE CREAM DISPENSING APPARATUS

[76] Inventor: William B. Seymour, 22-17 72nd St., Jackson Heights, N.Y. 11370

[21] Appl. No.: 209,020

[22] Filed: Jun. 20, 1988

[51] Int. Cl.$^4$ .............................................. B67D 5/60
[52] U.S. Cl. ................. 222/132; 222/144.5; 222/145
[58] Field of Search ............. 222/129.1, 132, 135–136, 222/139, 144.5, 145, 146.6, 255, 330, 271; 99/516–517, 532; 426/244

[56] References Cited

U.S. PATENT DOCUMENTS

| | | | |
|---|---|---|---|
| 2,762,318 | 9/1956 | Prouty | 222/145 |
| 3,272,388 | 9/1966 | Whitmore | 222/145 X |
| 3,460,716 | 8/1969 | Thomas | 222/145 X |
| 3,460,717 | 8/1969 | Thomas | 222/129.1 |
| 3,886,973 | 6/1975 | Kinney | 137/604 |
| 3,945,614 | 3/1976 | Suzuki et al. | 222/144.5 X |
| 4,136,720 | 1/1979 | Kinney | 141/9 |
| 4,635,825 | 1/1987 | Tulasne | 222/129.1 |
| 4,753,370 | 6/1988 | Rudick | 222/105 |

Primary Examiner—Michael S. Huppert
Attorney, Agent, or Firm—Evelyn M. Sommer

[57] ABSTRACT

A variegated soft ice cream dispensing apparatus is provided. The apparatus comprises and/or is used with a variegated ice cream freezer. A syrup dispensing apparatus is further provided and comprises reservoirs for a plurality of different types of syrups. A multi-channel pump is operative to direct a selected syrup or a selected combination of syrups from the reservoirs to a syrup nozzle head mounted in proximity to the outlet nozzle of the soft ice cream freezer. The syrup nozzle head comprises a plurality of nipples extending into the flow of soft ice cream. The flavor of the variegation and/or the degree of variegation can be altered in accordance with the customer's choice.

7 Claims, 2 Drawing Sheets

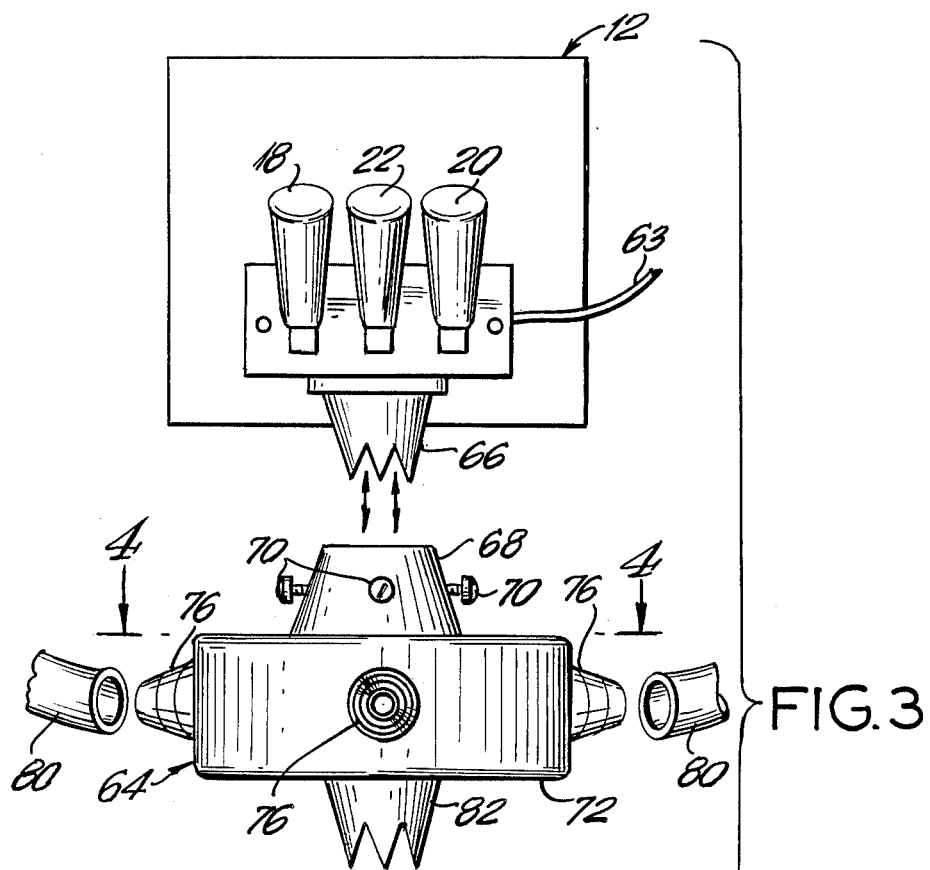
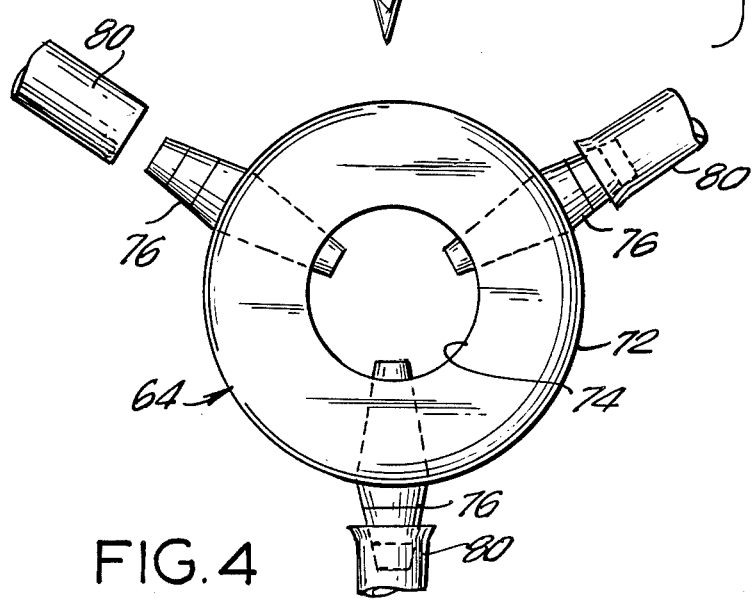
FIG. 3
FIG. 4

VARIEGATED SOFT ICE CREAM DISPENSING APPARATUS

BACKGROUND OF THE INVENTION

Variegated ice cream comprises a base ice cream with a smaller amount of a syrup or flavoring dispersed in the ice cream to achieve a marbled effect. In particular, the syrup is not thoroughly mixed with the ice cream, but remains physically and visually distinct throughout the ice cream. The syrup or flavoring which defines the variegation typically comprises less than 20% of the total ice cream composition by weight.

It is believed that variegated ice cream has become the fourth most popular ice cream type, ranking behind vanilla, chocolate and strawberry in total sales. The most popular flavors of variegated syrup for ice cream are believed to be chocolate, butterscotch, marshmallow, fudge, coffee, strawberry, pineapple, raspberry and caramel. The popularity of these variegated ice cream type is believed to be attributable to the attractive marble-like appearance, the contrasting flavors and the distinct mouthfeel. Combinations of the above described syrups or flavors with vanilla ice cream are widely known. However, a great many other combinations are possible and are at least periodically offered by the larger manufacturers of ice cream for retail.

Variegated ice cream has only been commercially available as a hard ice cream product. Available machines for making hard ice cream are able to precisely control the amount of the variegation desired in packages ranging from pints to half gallons for most retail distribution, and in larger amounts for wholesale distribution. These large expensive machines are set to create the selected blend of a particular type of syrup or flavoring with a particular type of base for hard ice cream. The available machines do not enable switching from one syrup type to another or from one ice cream type to another. Changing from one variegated hard ice cream type to another is roughly comparable to creation of an entirely new hard ice cream product. The available equipment for producing variegated hard ice cream generally is not adapted to achieve a single serving of a variegated hard ice cream.

Soft ice cream continues to be a popular variety of ice cream. Soft ice cream is made at the site of the retail sale in a freezer machine that is operative to dispense a selected serving size in accordance with the order placed by the consumer. Soft ice cream theoretically can be manufactured in a great many different flavors. However, each soft ice cream dispensing machine typically must be dedicated to a single particular flavor of ice cream. In view of the size and cost of these machines, most retail soft ice cream facilities typically will produce only the few most popular ice cream flavors. For example, most soft ice cream retail facilities will limit their ice cream selection to vanilla and chocolate. The larger retail soft ice cream facilities may offer vanilla, chocolate, strawberry and one featured flavor which may change periodically. This very narrow range of flavor options offered by soft ice cream facilities is considered to be a major marketing disadvantage.

Some soft ice cream machines have two different reservoirs, each of which is adapted to manufacture a selected flavor of soft ice cream (e.g. vanilla and chocolate). Some of these machines are provided with a single ice cream dispensing spout. The machine may be provided with separate levers for the two respective type of soft ice cream manufactured in the machine. One such lever may direct soft ice cream from one reservoir through the dispensing spout, while the other lever may alternatively be operated to direct soft ice cream from the other reservoir through the spout. Thus, a single machine may be operated to alternatively dispense different flavors of ice cream. Some such machines are provided with a lever which causes ice cream to flow simultaneously from both reservoirs, such that a single stream composed of two ice cream flavors will be dispensed from the spout. In particular, a flow of soft ice cream will emerge from the dispenser comprised substantially one half of one flavor (e.g. chocolate) and one half of another flavor (e.g. vanilla). Although machines of this type offer some variation to the very limited choices available through soft ice cream machines, the options available with even these advanced machines are extremely limited. Furthermore, the products resulting from these machines do not define a new flavor, but rather merely produce a serving of soft ice cream formed from two ice cream flavors. Although the resulting serving is visually interesting, the resulting taste and mouthfeel is no different from sequentially operating two separate soft ice cream machines.

The operation of the above described soft ice cream machines typically may involve dispensing a small amount of ice cream to be discarded. This may be done because the temperature and atmospheric conditions immediately adjacent the dispensing spout cause the ice cream adjacent thereto to acquire a temperature and consistency different from the remainder of the ice cream. This practice is even more common in machines which are operative to dispense different flavors from a single spout, to ensure that the retail customer gets only the flavors that were requested, and not a portion of a flavor requested by the previous customer.

Soft ice cream machines have not been manufactured to produce a variegated soft ice cream. Even if the known machines for manufacturing variegated hard ice cream could be adapted for soft ice cream purposes, they would generally be commercially unacceptable in that they are dedicated machines that would unacceptable limit the types of ice cream that are offered by the soft ice cream retailer. On the other hand, the ability to readily selectively produce a plurality of different variegated soft ice cream types could be a very significant marketing advantage to soft ice cream retailers in that the soft ice cream retailers could overcome their major marketing problem of a limited product offering.

A typical prior art apparatus for creating a variegated hard ice cream product is shown in U.S. Pat. No. 4,136,720 which issued to Kinney on Jan. 30, 1979, and which achieves a variegated hard ice cream by directing a plurality of separate streams into a single channel having a pattern inserted therein with an array of dividers. The apparatus shown in U.S. Pat. No. 4,136,720 is a dedicated device, provides no product flexibility and is not operative to create a variegated soft ice cream product comprising a flow of syrup selected from a plurality of separate reservoirs of the syrup.

U.S. Pat. No. 3,886,973 also issued to Kinney and is directed to an apparatus for producing a variegated hard ice cream product. In particular, U.S. Pat. No. 3,886,973 includes a primary channel through which the ice cream may flow. A plurality of separate tubes are disposed in the primary ice cream channel to dispense a selected syrup. The reference provides no teaching of delivering the syrup from a selected one of a plurality of different syrup reservoirs.

U.S. Pat. No. 4,635,825 issued to Tulasne on Jan. 13, 1987 and is directed to an apparatus which comprises a plurality of reservoirs of flavoring and a reservoir of liquid drinking yogurt, both of which are in communication with a mixer. A selected flavoring and the liquid drinking yogurt are fed into the mixer which is operative to combine the yogurt and the flavoring to create a substantially homogeneous flavored drink. The apparatus shown in U.S. Pat. No. 4,635,825 does not produce a variegated product and does not provide means for simultaneously delivering a selected combination of the flavors at a plurality of locations around the central stream.

In view of the above, it is an object of the subject invention to provide an apparatus for creating and dispensing a variegated soft ice cream.

It is another object of the subject invention to provide an apparatus to be mounted onto an existing soft ice cream dispensing machine to enable the production of a variegated soft ice cream.

It is a further object of the subject invention to provide an apparatus operative to selectively enable the creation of a plurality of different variegated ice cream types from at least a single soft ice cream dispensing machine.

An additional object of the subject invention is to provide a nozzle attachment and pumping apparatus to selectively intermix any of a plurality of different flavorings and/or syrups into a stream of at least one flavor of soft ice cream.

A further object of the subject invention is to provide an apparatus which enables consumers to custom design their own variegated soft ice cream by specifying the types and amounts of syrups and the flavor of the ice cream.

SUMMARY OF THE INVENTION

The subject invention is directed to the combination of a soft ice cream freezer/dispenser apparatus with a syrup dispensing apparatus. The subject invention can also be used in a freezer/dispenser which dispenses yoghurt, tofu, frozen custard and similar products and where a variegated appearance and/or flavor is desirable. The syrup dispensing apparatus may comprise a plurality of reservoirs of different types of syrup. The syrup may be disposed in containers which are replaceably mounted in the apparatus, such that a new syrup container can conveniently be mounted in the apparatus as a replacement for an empty container.

The syrup dispensing apparatus may further comprise valves in communication with each of the respective reservoirs of syrup. At least one pump may in communication with the valves and may be operative to pump the syrup from the selected reservoir upon the opening of the valve. The pump may be a multi-channel pump which is operative to draw syrup from a selected plurality of different reservoirs simultaneously. Thus, the pump and the valves may be operated in combination to selectively produce a blend of syrups, such as marshmallow/fudge; butterscotch/strawberry; or chocolate/coffee/caramel. Thus, a very large range of options of variegated syrups for blending with the soft ice cream is available in accordance with a particular customer's taste. In place of the syrups, other flavorants, colorants, fruit purees and the like may be employed.

The pump and/or the valves also may be operative to control the amount of variegation. In particular, the valves may be adjustably opened to provide either a small amount of the syrup or a relatively large amount. Furthermore, in the custom blending syrups, the operator of the machine may create a syrup comprising, for example, a relatively large amount of chocolate syrup with a substantially smaller amount of carmel.

Many of the available pumps may be employed in the apparatus of the subject invention. However, the preferred pump, as explained further below, is a peristaltic pump or a tubing pump which is operative to generate the pumping action by creating alternate contractions in the walls of the tubing which delivers the syrup from the reservoir. This type of pump is desirable in that the moving parts of the pump avoid all direct contact with the highly viscous and potentially clogging syrups. Preferably, the pump is capable of operating at a plurality of different speeds to further control the amount of variegation. However, an air operated pump could be satisfactorily employed in place of the peristaltic pump.

The apparatus may further comprise a syrup nozzle head that may be mountable to the dispensing nozzle of the soft ice cream freezer machine or that may be an integral part thereof. The syrup nozzle head may be connectable to the nozzle of the soft ice cream freezer by, for example, a plurality of set screws which engage a portion of the soft ice cream freezer nozzle. The syrup nozzle head comprises at least one inlet nipple, and preferably a plurality of inlet nipples which are in communication with the reservoirs of syrup. In particular, the inlet nipples of the syrup nozzle head may be constructed to permit tubing to be frictionally retained thereon.

The inlet nipples of the syrup nozzle head extend generally radially inwardly to communicate with the flow of the soft ice cream emerging from the nozzle of the soft ice cream freezer apparatus. Preferably, the inlet nipples of the syrup nozzle head extend inwardly a sufficient distance to direct the syrup to a location within the flow of the soft ice cream, and not merely at an external location. Thus, the syrup will be interspersed throughout the flow of soft ice cream.

The syrup dispensing apparatus preferably is constructed such that the major portion of the apparatus can be disposed at a location somewhat remote from the actual dispensing nozzles of the soft ice cream freezer. For example, the reservoirs of syrup, the valves, the pump and the power supply as well may be mounted on top of the freezer apparatus as shown, may be mounted to the side of the freezer apparatus or may be made integral with it. It is also possible for these parts to be placed elsewhere and suitably connected with the freezer. The controls of the syrup dispensing apparatus, however, should be at conveniently accessible location near the front of the soft ice cream freezer. At least one tube extending from the syrup pump extends to the vicinity of the soft ice cream freezer nozzle, and is connectable to the nipple of the syrup nozzle head. In the typical embodiment comprising a plurality of separate nipples on the syrup nozzle head, appropriate fittings may be placed in communication with the tube to enable the syrup to be directed to each of the inlet nipples.

The syrup dispensing apparatus and the soft ice cream freezer apparatus can be operated entirely independently of one another. Thus, it is possible to operate the soft ice cream dispensing apparatus to provide a nonvariegated ice cream in accordance with a particular customer's taste. On the other hand, the syrup dispensing apparatus conceivably could be operated independently to either clear the area of the nozzle of a previous syrup flavor or to dispense a syrup over the top of an ice cream in accordance with the customer's request. In the typical situation, however, the soft ice cream dispensing apparatus and the variegate syrup dispensing apparatus will be operated simultaneously to produce a variegated soft ice cream. The particular flavor combination and the amount of variegation will be selected prior to operating the soft ice cream freezer and in accordance with the request of the consumer. The syrup pump may be operatively connected to the handle of the ice cream dispenser to enable the movement of the ice cream dispenser handle to simultaneously initiate the flow of soft ice cream and syrup.

BRIEF DESCRIPTION OF THE DRAWINGS

FIG. 3 is an exploded front elevational view of the dispensing portion of the variegated ice cream dispensing apparatus.

FIG. 4 is a cross-sectional view taken along line 4—4 in FIG. 3.

DETAILED DESCRIPTION OF THE PREFERRED EMBODIMENT

Figure 1:
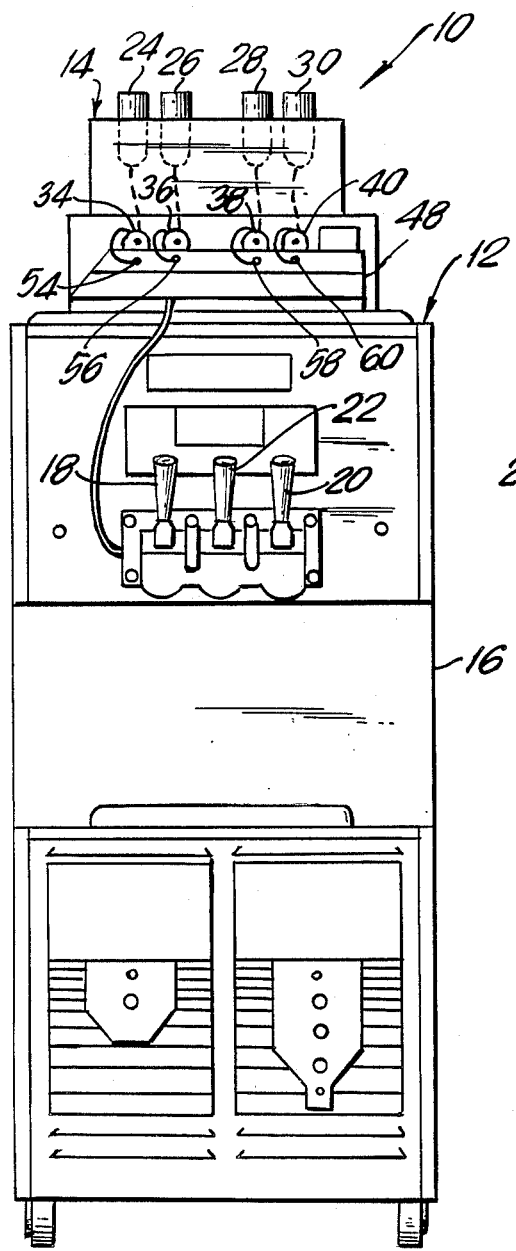
FIG. 1 is a front elevational view of a variegated soft ice cream dispensing apparatus in accordance with the subject invention.

The variegated soft ice cream dispenser of the subject invention is indicated generally by the numeral 10 in FIG. 1. The variegated soft ice cream dispenser 10 comprises a soft ice cream freezer 12 and a syrup dispenser identified generally by the numeral 14. The soft ice cream freezer 12 may be one of the known soft ice cream dispensers that are available on the market, while the variegate syrup dispenser 14 is adapted to mount on and cooperatively function with the soft ice cream dispenser 12.

The soft ice cream freezer 12 comprises a housing 16 in which means for making and appropriately refrigerating two flavors of soft ice cream are disposed. The soft ice cream dispenser 12 further comprises handles 18, 20 and 22 on the front face thereof. The handles 18–22 are manually operable and are mechanically or electrically joined to valves which permit a flow of soft ice cream to be directed therefrom. The handles 18 and 20 are operative to selectively generate separate flows of soft ice cream from each of the respective reservoirs (not shown) disposed within the housing 16. While as illustrated, the invention is shown as having three handles and three reservoirs, two, four or five are equally suitable. For example, actuation of the handle 18 may initiate a flow of chocolate soft ice cream, while actuation of the handle 20 may initiate a flow of vanilla soft ice cream. The handle 22 may be operatively connected to both reservoirs of ice cream within the soft ice cream dispenser 12 such that both flavors of soft ice cream will flow through a single nozzle at the same time. The particular construction of the nozzle will be described further below.

Figure 2:
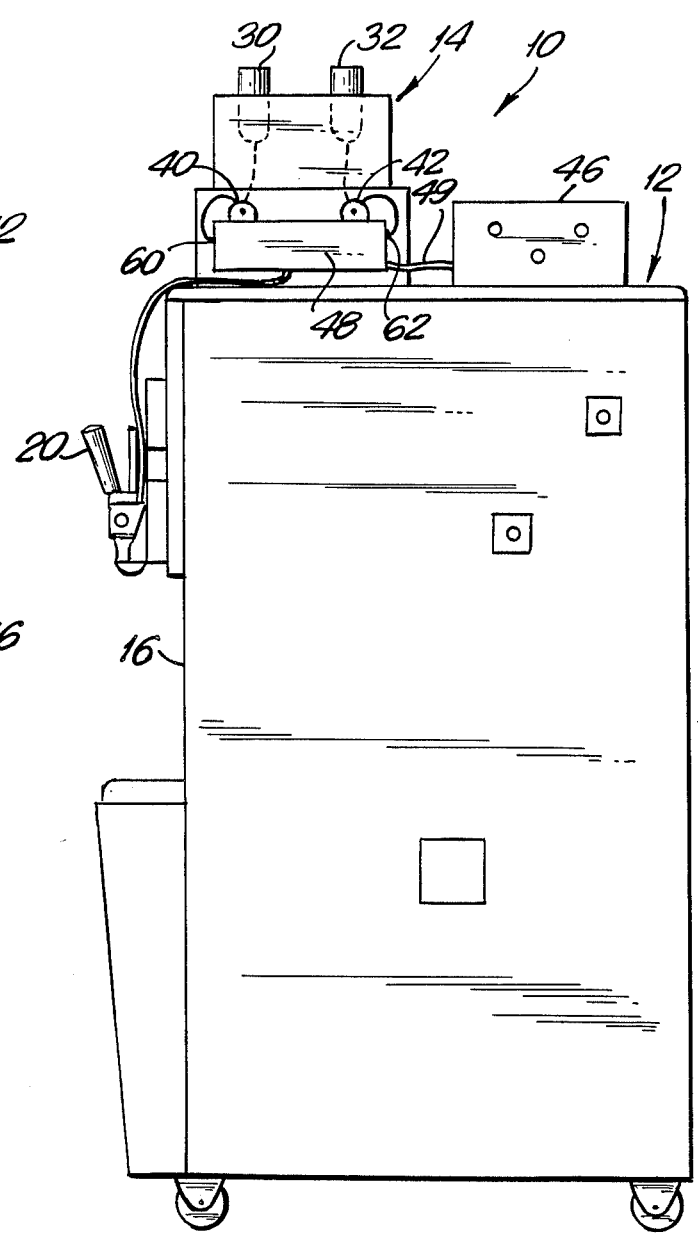
FIG. 2 is a side elevational view of the apparatus shown in FIG. 1.

A substantial part of the syrup dispensing apparatus 14 is mounted on the top of the housing 16 of the soft ice cream freezer 12. In particular, the syrup dispensing apparatus 14 comprises a plurality of reservoirs 24–32 for the variegate syrup. As depicted in FIGS. 1 and 2, the syrup dispensing apparatus 14 comprises two rows of five dispensing reservoirs. However, embodiments with more or fewer reservoirs may be provided.

Each syrup reservoir 24–32 preferably defines a bottle or similar container comprised of glass, stainless steel or plastic and may even take the form of a suitably constructed plastic bag of syrup having an opening. The syrup dispensing apparatus 14 is constructed to enable each bottle or other such reservoir 24–32 to be placed in communication with a tube or other similar conduit for directing the syrup gravitationally from the respective syrup reservoir 24–32. If the reservoirs of syrup, the valves, the pump and the power supply are mounted to the side of the soft ice cream freezer or located otherwise and suitably connected, the syrup may be directed from the respective reservoirs by suitable pumping means.

The syrup dispensing apparatus 14 further comprises valves 34–42 which are in communication with the syrup reservoirs 24–32 respectively. The valves 34–42 are adjustable to create openings of various selected cross-sectional dimensions, and to thereby enable varying flow rates from the corresponding syrup reservoirs 24–32. The valves 34–42 are electrically or air operated such that one valve can be opened a selected amount and such that a plurality of valves each may be opened a selected respective amount simultaneously. The operation of the valves 34–42 is controlled by a power supply 46 which also may be mounted on the soft ice cream dispenser 12 in proximity to the valves 34–42, and which may define a portion of the syrup dispenser apparatus 14.

The syrup dispensing apparatus 14 further comprises a multi-channel peristaltic pump 48. In particular, the pump 48 is in communication with each of the valves 34–42 by means of tubing which extends from each respective valve to a corresponding pump head 54–62. The pumps are disposed such that the viscous flavored syrups in the respective reservoirs 24–32 will flow gravitationally through the valves 34–42 and into the corresponding pump heads 54–62. Each pump head 54–62 will define parts of the peristaltic pump 48 which provide variable respective flow rates ranging from 0 to 8 milliliters per second. Each respective peristaltic pump head 54–62 is operative to alternately compress and relax a flexible tubing passing through the pump body. The alternate flexing and relaxing may be carried out by a set of rotating rollers which are sequentially brought into rolling contact with the flexible tub. Thus, the peristaltic pump 48 avoids all direct contact between the moving components of the pump and the highly viscous syrups being directed through the respective pump heads 54–62. The flow rate through each respective peristaltic pump head 54–62 of the pump 48 can be adjusted by the speed of a drive shaft operating all of the peristaltic pump 54–62 or by selectively restricting the diameter of the tubes approaching the pump 48, by, for example, a pinching clamp or a hose cork. Additionally, as noted above, the respective valves leading from the reservoirs 24–32 of the syrup also can be adjusted to control the rate of flow of syrup. An example of an acceptable pump is MASTERFLEX® five or ten channel drive tubing pump.

The best tubing found for use with the peristaltic pump has been found to be either a silicone tubing or the TYGON food tubing identified by the specification number B-44-4X. The silicone tubing has a wide temperature range and a long life and has been found to withstand pump head squeezing action in a peristaltic pump at 200 revolutions per minute for approximately 450 hours before beginning to lose its elasticity. The TYGON food tubing is specifically designed for use in pumping food products. Both of these tubes meet both USDA and FDA standards. Other tubing that may be acceptable includes other TYGON variations and C-FLEX tubing.

The apparatus 10 is constructed such that the type of syrups and flow rate of syrups are first selected and adjusted, and then the soft ice cream product is extruded according to the normal operation of the freezer. The actuation of the handle for the soft ice cream freezer will automatically initiate the flow of the selected variegate syrups at the selected flow rates. In particular, the handles 18-22 for initiating the flow of soft ice cream are operatively connected to the power source 46 by cable 63 such that the movement of the soft ice cream handle 18-22 initiates the action of the peristaltic pump 48.

The syrup nozzle head of the subject invention is identified generally by the numeral 64 in FIGS. 3 and 4 and is mountable to the outlet nozzle 66 from the soft ice cream freezer 12. In particular, the syrup nozzle head 64 comprises a mounting collar 68 having a plurality of set screws 70 which enable direct mechanical engagement between the mounting collar 68 and the outlet nozzle 66 of the soft ice cream freezer apparatus 12. The syrup nozzle head 64 further comprises an annular inlet collar 72 having a central aperture 74 extending axially therethrough. The inlet collar 72 is securely engaged to the mounting collar 68. A plurality of inlet nipples 76 extend generally radially through the inlet collar 72 to protrude from the inner circumferential surface thereof, and to extend outwardly from the outer surface of the inlet collar 72 a sufficient distance to enable the tubes 80 to be mounted thereon. More particularly, the tubes 80 extend from the peristaltic pump unit, described above and shown in FIGS. 1 and 2, to the inlet nipple 76 of the syrup nozzle head 64 of FIGS. 3 and 4. The tubes 80 communicate with one another and with the peristaltic pump 48 by means of appropriate fittings (not shown).

The variegated soft ice cream dispenser 10 is operated by initially selecting the appropriate syrups from reservoirs 24-32 to be in a particular serving of soft ice cream. Any one of the available syrups may be used independently or a blend of a plurality of different syrups may be employed. Alternatively, in accordance with the wishes of a selected customer, the syrup dispensing apparatus 14 may be set to prevent any flow of syrup, thereby providing a pure unvariegated soft ice cream serving. The speed of the peristaltic pump may also be varied to control the amount of variegation achieved. Typically, the flow rates can be varied to achieve a range of 0% to 20% of the syrup as part of the total variegated soft ice cream serving by weight. The peristaltic pump 48 is operatively connected to both the power unit 46 by means of connection 49, and to the soft ice cream dispensing head by means of cable connection 63. Thus, after the particular type and flow rate of the syrups are selected, the movement of the handles 18-22 will initiate the actuation of the peristaltic pump 48, thereby causing a flow of the selected syrup through the tubing 80 and into the syrup nozzle head 64. Simultaneously, the soft ice cream flowing from the dispensing nozzle 66 will continue through the central aperture 74 of the syrup nozzle head 64. The radial extension of the nipples 76 beyond the inner circumferential wall 74 of the inlet collar 72 will cause the syrup to be directed inwardly within the flow of the soft ice cream. The resulting variegated soft ice cream product will be directed through the outlet nozzle 82 and into a cone 84 or other suitable receptacle.

While the invention has been described with respect to a preferred embodiment, it is apparent that various changes can be made without departing from the scope of the invention as defined by the appended claims.

What is claimed is:

1. A syrup dispensing apparatus for mounting to a soft ice cream freezer apparatus for producing a variegated ice cream product of the type having one or more syrup flavors combined in an ice cream with a marble-like appearance, said soft ice cream freezer apparatus comprising a dispensing nozzle and actuator means for selectively starting and stopping a flow of soft ice cream through the dispensing nozzle, said syrup dispensing apparatus comprising:

a plurality of syrup reservoirs for storing respective ones of a plurality of different flavors of syrup therein;

a multi-channel pump in communication with each of said plurality of syrup reservoirs and operative to selectively pump syrup from selected ones of said syrup reservoirs; and a syrup nozzle head mountable to the dispensing nozzle of the soft ice cream freezer, said syrup nozzle head comprising a mounting collar having means for fixedly engaging the dispensing nozzle of the soft ice cream freezer, an annular inlet collar having a through aperture through which soft ice cream from the dispensing nozzle of the soft ice cream freezer is flowable, said annular inlet collar further having a plurality of nipples spaced circumferentially around and extending generally radially into the through aperture, said nipples being in communication with said multi-channel pump such that said pump is operative to direct selected flavors of syrup from said reservoirs into said nipples at a plurality of locations circumferentially around and into a flow of soft ice cream directed through the through aperture of said syrup nozzle head for creating a variegated soft ice cream product, whereby the type of variegated soft ice cream produced can be changed by selecting the reservoirs from which the multi-channel pump will pump the syrup.

2. A syrup dispensing apparatus as in claim 1 wherein the multi-channel pump means is a multi-channel peristaltic pump.

3. A syrup dispensing apparatus as in claim 2 comprising a plurality of flexible tubes, said tubes extending respectively from each of the plurality of syrup reservoir means to the peristaltic pump.

4. A syrup dispensing apparatus as in claim 3 wherein said peristaltic pump comprises a plurality of peristaltic pump units each being selectively operable independent of the others to alternately compress and relax the tubing extending from the respective reservoir means.

5. A syrup dispensing apparatus as in claim 1 further comprising valve means intermediate each respective reservoir and the multi-channel pump for controlling the flow of syrup from each respective reservoir to the multi-channel pump.

6. A syrup dispensing apparatus as in claim 1 wherein said multi-channel pump is operatively connected to said actuator means of said soft ice cream freezer, such that the dispensing of soft ice cream from said soft ice cream freezer operates the pump to deliver a selected blend of syrup to the syrup nozzle head.

7. A variegated soft ice dispensing apparatus for producing a variegated ice cream product of the type having one or more syrup flavors combined in an ice cream with a marble-like appearance, comprising:

a soft ice cream freezer apparatus for making and dispensing a flow of soft ice cream, including a dispensing nozzle and actuator means for selectively starting and stopping a flow of soft ice cream through said dispensing nozzle; and a syrup dispensing apparatus including:
    (1) a plurality of syrup reservoirs for storing respective ones of a plurality of different flavors of syrup therein;
    (2) a multi-channel pump in communication with each of said plurality of syrup reservoirs and operative to selectively pump syrup from selected ones of said syrup reservoirs; and
    (3) a syrup nozzle head mountable to the dispensing nozzle of the soft ice cream freezer, said syrup nozzle head comprising a mounting collar having means for fixedly engaging the dispensing nozzle of the soft ice cream freezer, an annular inlet collar having a through aperture through which soft ice cream from the dispensing nozzle of the soft ice cream freezer is flowable, said annular inlet collar further having a plurality of nipples spaced circumferentially around and extending generally radially into the through aperture, said nipples being in communication with said multi-channel pump such that said pump is operative to direct selected flavors of syrup from said reservoirs into said nipples at a plurality of locations circumferentially around and into a flow of soft ice cream directed through the through aperture of said syrup nozzle head for creating a variegated soft ice cream product, whereby the type of variegated soft ice cream produced by said apparatus can be changed by selecting the reservoirs from which the multi-channel pump will pump the syrup.

* * * * *